(12) United States Patent
Sagy et al.

(10) Patent No.: US 8,371,343 B2
(45) Date of Patent: Feb. 12, 2013

(54) METHOD AND APPARATUS TO FACILITATE DETERMINING PROPER PLACEMENT OF A LIQUID

(75) Inventors: Arthur A. Sagy, Guttenberg, NJ (US); Julio A. Gonzalez, Jacksonville, FL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 1327 days.

(21) Appl. No.: 12/109,008

(22) Filed: Apr. 24, 2008

(65) Prior Publication Data
US 2009/0266434 A1 Oct. 29, 2009

(51) Int. Cl.
*B65B 1/04* (2006.01)

(52) U.S. Cl. ............... 141/98; 141/1; 141/83; 53/128.1; 356/237.1

(58) Field of Classification Search ................ 141/1, 18, 141/83, 94, 98, 192; 53/128.1; 73/10, 865.8; 184/5, 6.21; 29/890.124; 356/237.1; 156/513, 156/517
See application file for complete search history.

(56) References Cited

U.S. PATENT DOCUMENTS

| | | | | |
|---|---|---|---|---|
| 5,006,181 A * | 4/1991 | Masuda et al. | ................. | 148/111 |
| 5,277,741 A * | 1/1994 | Kramer | .......................... | 156/353 |
| 5,641,544 A * | 6/1997 | Melancon et al. | ............ | 427/331 |
| 6,477,885 B1 * | 11/2002 | Sekine et al. | ...................... | 73/10 |
| 7,328,543 B2 * | 2/2008 | Hoffman et al. | ............. | 53/128.1 |
| 8,082,644 B2 * | 12/2011 | Hoffman et al. | ............. | 29/213.1 |

\* cited by examiner

*Primary Examiner* — Timothy L Maust
(74) *Attorney, Agent, or Firm* — Fitch, Even, Tabin & Flannery, LLP

(57) ABSTRACT

One provides (101) a plurality of one-way degassing valves (202) that are to be installed on corresponding containers and places (102) a viscous liquid (such as silicon oil) (205) in each of the plurality of one-way degassing valves to provide a corresponding plurality of installable one-way degassing valves (208). These teachings then provide for automatically and non-destructively determining (103), prior to installation of these valves on the corresponding containers, whether the viscous liquid has been properly placed.
By one approach, this can comprise using a captured image (210) of at least a portion of each such one-way degassing valve to make this determination.

29 Claims, 3 Drawing Sheets

METHOD AND APPARATUS TO FACILITATE DETERMINING PROPER PLACEMENT OF A LIQUID

TECHNICAL FIELD

This invention relates generally to one-way degassing valves as are employed to facilitate the degassing of container contents.

BACKGROUND

Some containers contain contents that naturally emit gas. Ground coffee beans are one example in this regard as ground coffee beans can exude carbon dioxide for days or even weeks following being ground. Such a process can lead to various problems as the result of an undue build-up of pressure within such a container. One-way degassing valves are therefore often employed to permit such gasses to be automatically removed from within the container. One-way degassing valves are offered, for example, by Plitek, LLC of Des Plaines, Ill. The interested reader can learn more regarding such valves by studying U.S. Pat. No. 7,178,555 entitled Pressure Relief Valve, the contents of which are fully incorporated herein by this reference.

Such one-way degassing valves are often comprised of layers of a suitable plastic sheet material where one of the layers has a hole/aperture formed there through and another layer having narrow channels formed therein. When sufficient pressure builds up in a corresponding container, the atmospheric contents of the container push outwards on an outer surface of the one-way degassing valve (having entered via the aforementioned hole/aperture) and this in turn permits the atmospheric contents to be evacuated via the aforementioned narrow channels. At some point, this internal atmospheric pressure is insufficient to retain the outer layer of the valve in this extended position and the outer layer returns to a position that blocks the described access to the channels.

As noted, such one-way degassing valves are known in the art. It is also known in the art to dispose a small amount of silicon oil (often in combination with some selected amount of graphite material) in the valve itself to enhance the functionality of the valve (including, specifically, instigating the "one-way" nature of its behavior). With the right amount of oil placed in the right location, the efficacy of the one-way degassing valve is considerably enhanced. Unfortunately, assuring that these placement requirements are met can be challenging and typically involve destructive testing of the one-way degassing valve. In particular, assuring the efficacy of oil placement in such a one-way degassing valve in a production setting that includes the installation of such valves can be particularly challenging.

BRIEF DESCRIPTION OF THE DRAWINGS

The above needs are at least partially met through provision of the method and apparatus to facilitate determining proper placement of a liquid described in the following detailed description, particularly when studied in conjunction with the drawings, wherein.

Figure 1:
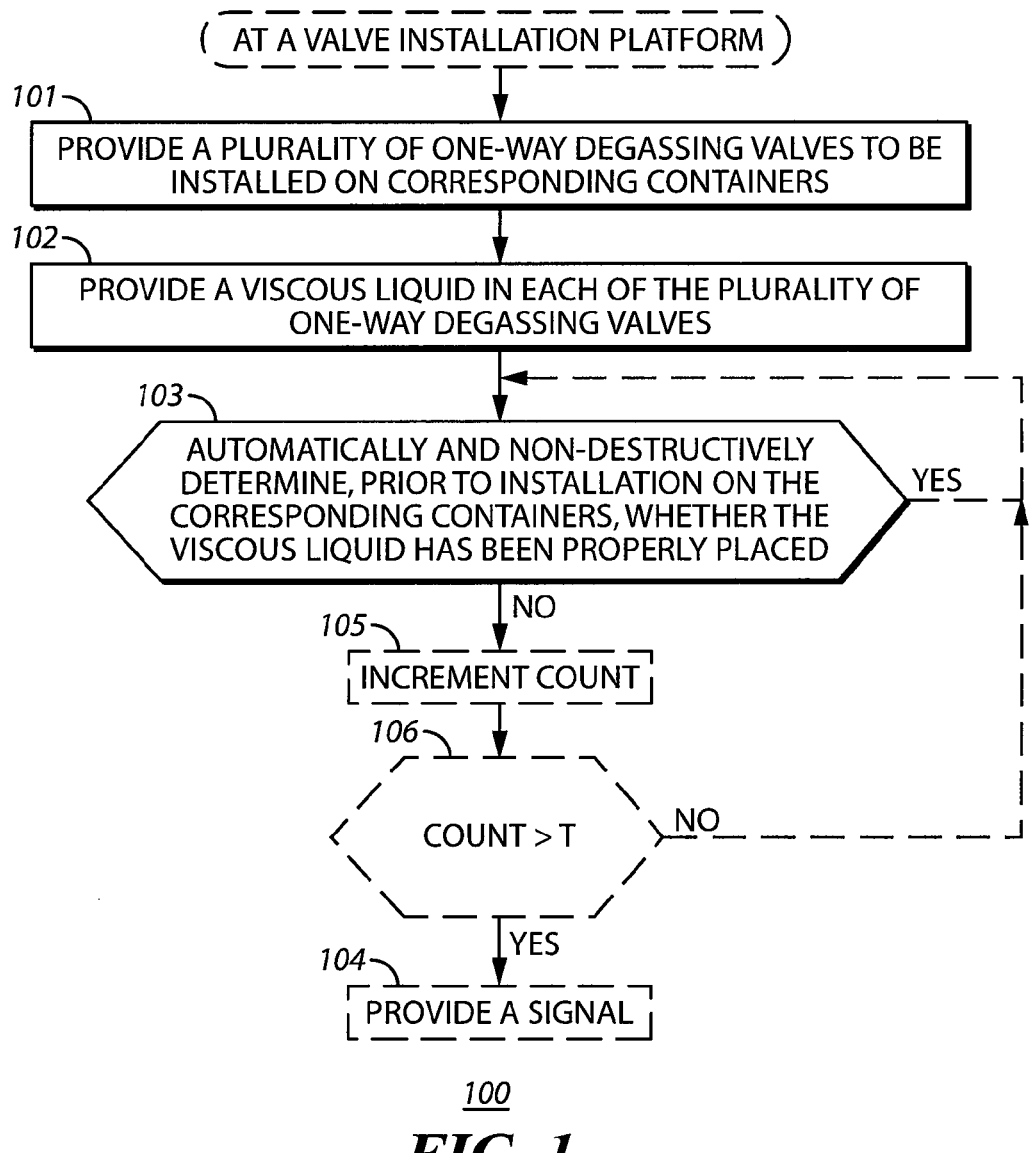
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, one provides a plurality of one-way degassing valves that are to be installed on corresponding containers and places a viscous liquid (such as silicon oil) in each of the plurality of one-way degassing valves to provide a corresponding plurality of installable one-way degassing valves. These teachings then provide for automatically and non-destructively determining, prior to installation of these valves on the corresponding containers, whether the viscous liquid has been properly placed.

By one approach, this can comprise using a captured image of at least a portion of each such one-way degassing valve to make this determination. So configured, and by making an automated comparison of each such captured image with comparison image data representing both acceptable and unacceptable placement of the viscous liquid within the one-way degassing valves, it becomes possible and feasible to make this determination for each and every one of the installable one-way degassing valves (even at very high production-setting speeds).

Those skilled in the art will understand and appreciate that such teachings are applicable in both an original manufacturing setting (when the one-way degassing valves are first manufactured) and in an application production setting (when the one-way degassing valves are installed on the aforementioned containers). These teachings are readily leveraged using existing technology (such as existing image capture devices and so forth) and will, no doubt, also readily accommodate future improvements in these regards. It will also be appreciated that these teachings are highly scalable and can be beneficially applied in conjunction with a variety of differently sized one-way degassing valves as well as one-way degassing valves having a variety of form factors.

These and other benefits may become clearer upon making a thorough review and study of the following detailed description. Referring now to the drawings, and in particular to FIG. 1, an illustrative process that is compatible with many of these teachings will now be presented. Those skilled in the art will recognize and appreciate that this process 100 can be carried out at the time of manufacturing the one-way degassing valves or at essentially anytime thereafter. For the sake of example but with no intent of suggesting any limitations in this regard, it will be presumed for the remainder of this description that this process 100 is being carried out at a point of usage; i.e., at a one-way degassing valve installation platform such as one finds in a coffee packaging facility.

This process 100 includes the step 101 of providing a plurality of one-way degassing valves that are to be installed on corresponding containers (such as ground coffee containers made or metal or plastic materials) to thereby facilitate later automatic degasification of the stored contents of those containers. By one approach, and referring momentarily to FIG. 2, this can comprise using a feeder 201 to provide the plurality of one-way degassing valves 202. This can comprise, if desired, feeding a web or strip of such valves 202 from a corresponding roll 203 of one-way degassing valves in accordance with well understood practice in this regard. In this illustrative example, it will be presumed that these one-way degassing valves 202 are being provided with their holes/apertures oriented upwardly though other orientations could be accommodated if desired.

Figure 2:
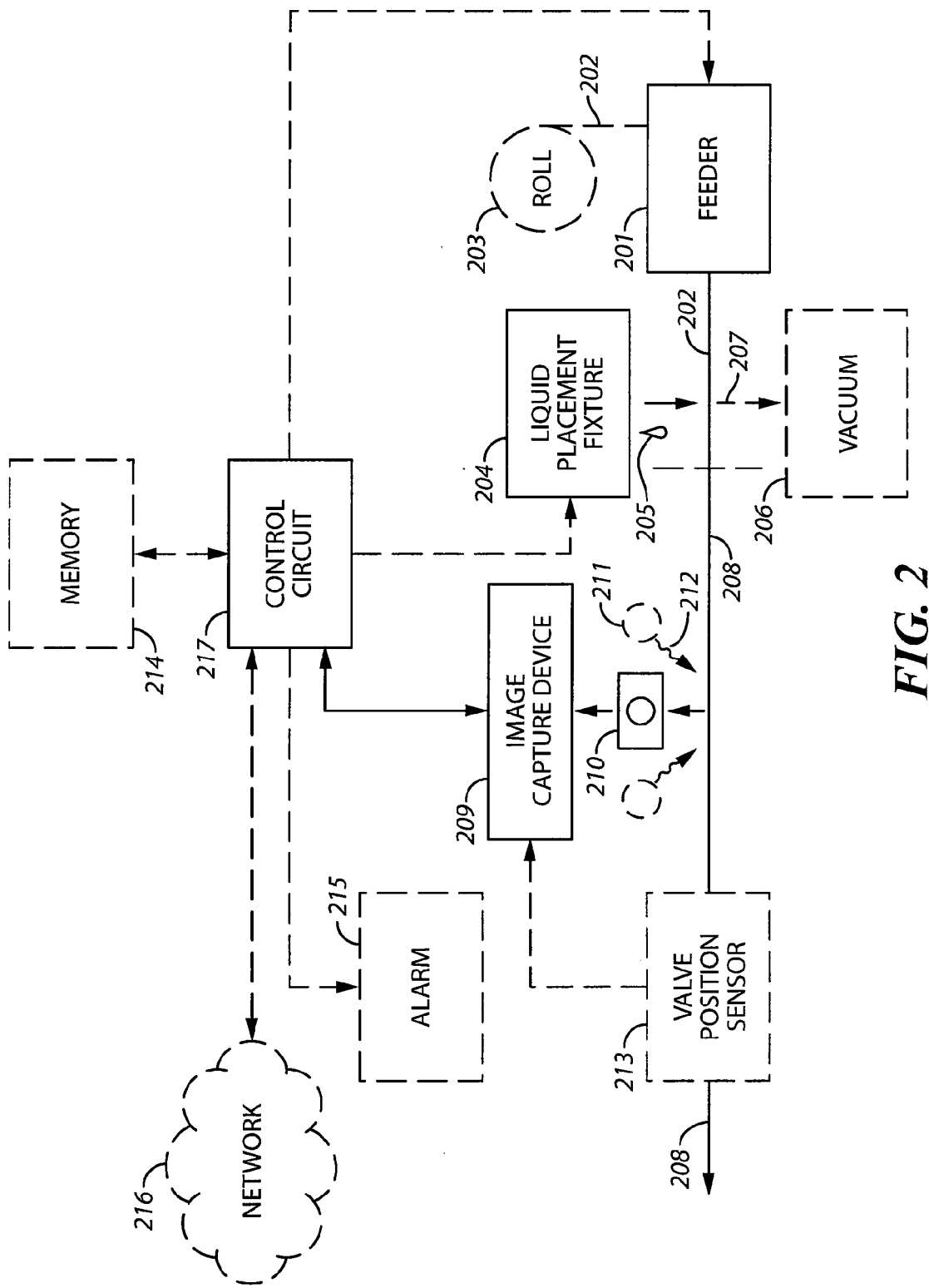
FIG. 2 comprises a block diagram as configured in accordance with various embodiments of the invention.

Referring now to both FIG. 1 and FIG. 2, this process 100 also includes the step 102 of placing a viscous liquid 205 in each of the plurality of one-way degassing valves 202 to provide a corresponding resultant plurality of installable one-way degassing valves 208. Those skilled in the art will understand that these valves can now be considered "installable" because of the inclusion of the viscous liquid 205 in the valves. A liquid placement fixture 204 can serve to place a drop of the viscous liquid 205 in this manner. If desired, a vacuum 206 can be used to provide suction 207 that in turn pulls on the opposing side of the valves to facilitate entry of the viscous liquid 205 into the valves.

For many purposes, the viscous liquid 205 can comprise silicon oil. This can be pure silicon oil if desired, but many application settings will benefit from using a silicon oil mixture. For example, when employed with ground coffee containers, a mixture of graphite and silicon oil can provide particularly efficacious results. For example, it is known to use a ratio of about 1.5 grams of graphite to about 1 gallon of silicon oil for these purposes.

The liquid placement fixture 204 provides a metered amount of the viscous liquid 205. Notwithstanding that modern equipment to effect such functionality is capable of high precision (with respect to the quantity of liquid dispensed, the timing of such dispensation, and the placement of the liquid), as noted earlier, it is possible for the viscous liquid to be improperly placed in a given instance. This can occur when the placement parameters become uncalibrated for whatever reason, because a particular one-way degassing valve itself is somehow faulty, and so forth. This process 100 therefore also provides the step 103 of automatically and non-destructively determining for at least some of the plurality of installable one-way degassing valves (and preferably for essentially all of these valves) whether the viscous liquid has been properly placed. By one approach, this process 100 effects this step 103 prior to installation of the inspected valve on a corresponding container.

As used herein, it will be understood that the expression "properly placed" can refer to both placing an appropriate amount of the viscous liquid in the valve (i.e., an amount that is neither too much nor too little) as well as placing the viscous liquid such that the liquid occupies a proper location within the one-way degassing valve. In many cases, a failure in either of these regards (i.e., that the viscous liquid is either not fully present at a particular location or that the viscous liquid is not present in the appropriate amount) can be viewed as a failure to properly place the viscous liquid in the one-way degassing valve as the latter may not operate as desired following installation of the one-way degassing valve with respect to a corresponding container.

By one approach, and referring again to FIG. 2, this determination can be based, at least in part, upon using a captured image 210 of at least a portion of a given one-way degassing valve. An image capture device 209 can be employed to capture these images 210. Various devices will suffice in these regards with digital cameras being particularly well suited for many application settings. As one particularly useful though non-limiting example in this regard, an Omron F210S1 digital camera will serve well in an industrial application setting for these purpose. The captured images 210 can be monochromatic, ordinary full color, or enhanced/modified color as desired (with a particular selection in this regard often depending upon the particular image processing platform software/engine to be employed).

This process will readily accommodate using one or more light sources 211 to direct light 212 towards the image subject. By one approach, this can comprise disposing one or more of the light sources 211 between the image capture device 209 and the installable one-way degassing valve for which an image is to be captured. As one specific but non-limiting example in this regard, the light source 211 can comprise an indirect light source such as an LFV2-50D light source as manufactured by CCS America, Inc. as is provided by Omron. Such a light can aid, for example, in facilitating capturing a useful image of the installable one-way degassing valve. For some purposes, this light 212 can comprise visible light. If desired, however, this light 212 may comprise, wholly or partially, shorter or longer wavelengths of light to suit, for example, illumination characteristics of the viscous liquid and/or the one-way degassing valve itself.

If desired, this step would accommodate capturing a plurality of images of each one-way degassing valve in order to permit a comparison between such images. This might involve, for example, capturing one image using one wavelength of light and another image using a second, different wavelength of light. As another example, this might comprise capturing a first image when the one-way degassing valve is at a first location and a second image when the same one-way degassing valve is at a second, different location.

As noted, this step of determining whether the viscous liquid has been properly placed can occur in an application setting where the one-way degassing valve is to be installed on a container within a short time (for example, within a few seconds or in less than a second) of when the viscous liquid is placed within the valve. In such an application setting, then, this process 100 will accommodate making this determination regarding proper placement of the viscous liquid within a few seconds (or less) of the viscous liquid having been so placed. As one specific but non-limiting example in this regard, this process 100 will accommodate capturing the aforementioned image within three to five valves of when the viscous liquid 205 is dispensed by the liquid placement fixture 204. In such a case, the image capture device 209 will be placed only a very few centimeters away from the liquid placement fixture 204.

Such a process will of course benefit from capturing the aforementioned image of the one-way degassing valve at an appropriate time (i.e., when the valve is well within the field of view of the image capture device 209 and preferably when the valve is specifically at a particular location therein, such as when the valve is itself centered within this field of view). Such precision can serve to ease and simplify the task of processing the image to access the proper placement of the viscous liquid. To aid in this regard, a valve position sensor 213 can serve to receive the installable one-way degassing valves 208 and to sense, for example, the leading and/or trailing edges of the individual valves as the web bearing these valves passes therethrough. Such a sensor, for example, can pass a light through the web and use a light sensitive element to detect such edges as they pass through the valve position sensor 213. As one non-limiting example in this regard, such a valve position sensor 213 can be comprised of two pass-through fiber optic cables that are coupled to an Omron E3Z amplifier that provides the corresponding trigger signal to the image capture device 209.

As these valves tend to be placed with considerable precision on such a web, it can then be relatively simple to determine when a trailing one-way degassing valve is properly within the field of view of the image capture device 209 by monitoring the present location of a leading valve via this valve position sensor 213. It would also be possible to make such a measurement from a point earlier in the process (such as between the insertion of the liquid and the capturing of the image) if desired.

Figure 4:
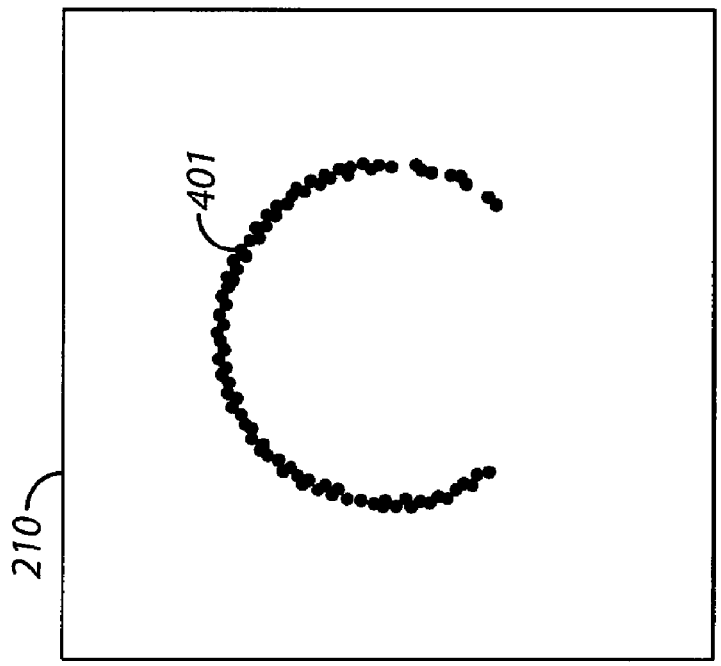
FIG. 4 comprises a schematic top plan depiction of a captured image as configured in accordance with various embodiments of the invention.
Figure 3:
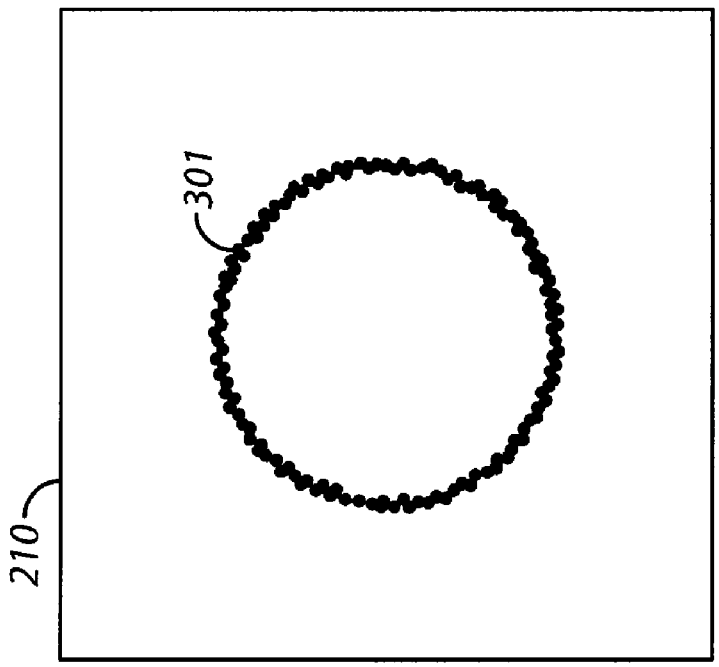
FIG. 3 comprises a schematic top plan depiction of a captured image as configured in accordance with various embodiments of the invention.

In this illustrative example, a control circuit 213 operably couples to the aforementioned image capture device 209 in order to receive and process the captured images 210 and make the corresponding decision regarding proper placement of the viscous liquid with respect to the one-way degassing valve. This can comprise, for example, automatically comparing the captured image with one or more models and/or templates that depict acceptable and/or unacceptable images. To illustrate this point, FIG. 3 presents an example of what an appropriate amount of an appropriately placed viscous liquid will look like in such a captured image 210. In particular, the outer periphery 301 of the viscous liquid will be quite visible and will appear as a complete or substantially complete circle, oval, or the like. With reference to FIG. 4, is one possible example of an improperly placed drop of viscous liquid will often appear as having a substantially incomplete periphery 401 (such as less than a seventy-five percent complete periphery).

Those skilled in the art will recognize and appreciate that such a control circuit can comprise a fixed-purpose hardwired platform or can comprise a partially or wholly programmable platform. As one specific but non-limiting example in these regards, the control circuit can comprise an Omron F210C10 ETN. All of these architectural options are well known and understood in the art and require no further description here.

Such a control circuit can be configured (via, for example, corresponding programming as will be well understood by those skilled in the art) to carry out or otherwise facilitate one or more of the aforementioned steps, actions, and/or functionality. This can specifically include receiving the aforementioned captured images in a compatible digital format of choice and automatically inspecting those images to assess whether the viscous liquid has been properly placed. As noted, such an assessment can comprise, in whole or in part, a comparison of at least portions of a given captured image with one or more comparative models/template images or datasets to determine how well, or how poorly, the given captured image compares with an example of a properly placed and/or a non-properly placed viscous liquid.

By one approach, if desired, this control circuit 213 can operably couple to a memory 214. This memory 214 can serve to store, for example, the aforementioned comparative models/templates and/or the programming used by the control circuit 213 to carry out the described actions. This memory 214 can also serve, if desired, to store one or more of the captured images. By one approach, this can comprise each and every such captured image. By another approach, this can comprise only storing certain selected captured images (such as a selected periodic sample or only those captured images that evidence improperly placed viscous liquid). Such stored images can be useful for archival purposes, for auditing purposes, for maintenance and troubleshooting purposes, and so forth.

Generally speaking, and referring again to FIG. 1, this process 100 can simply provide for continuing to make the described inspections so long as the inspections yield benign results. A variety of actions may be considered, however, at such time as when one of these inspections detects a one-way degassing valve having improperly placed viscous liquid. By one approach, and again generally speaking, this process 100 can optionally include a step 104 that comprises responsively providing a corresponding signal. The precise nature of this signal can vary with the requirements and/or opportunities as tend to characterize a given application setting.

For example, by one approach, this signal can comprise an alarm signal that causes a local alarm 215 to be actuated in order to attract the attention of authorized personnel. By another approach, alone or in conjunction with the above, this alarm signal can be transmitted (for example, via an intervening network 216 such as, but not limited to, the Internet) to actuate a remotely located alarm (such as an alarm in a supervisor's office within the facility that houses this valve installation platform, in an alarm monitoring station in another building, or the like). These alarms can make use of any desired modality including audible alarms, visual alarms, and so forth.

By another approach, this signal can prompt the control circuit 213 to log the event and to store that information in the memory 214. This approach can serve to store data regarding the detected event to potentially help with subsequent maintenance, troubleshooting, and/or equipment/process calibration efforts.

As yet another approach in these regards, this signal can comprise a control signal that directs one or more of the valve installation platform components to be adjusted and/or brought to a halt. For example, by one approach, the control circuit 213 can be directly or indirectly coupled to the feeder 201, the liquid placement fixture 204, and/or other components as may pertain to the overall process to thereby facilitate bringing the line to a halt upon detecting an improperly prepared one-way degassing valve As another example, the control circuit 213 could provide an instruction that causes the faulty valve to be skipped without otherwise causing the valve installation line to be brought to a halt.

By one approach, any or all of the above-described actions can be taken upon detecting a single one-way degassing valve having an improperly placed viscous liquid. If desired, this process 100 can be rendered somewhat more tolerant of an occasional such aberration. To illustrate one illustrative example in this regard, this process 100, upon detecting an improperly placed viscous liquid, can (at step 105) increment a count of such events. The process 100 can then, at step 106, determine whether this aggregate count exceeds some predetermined threshold value T (where T will be understood to comprise an integer having a value of one or larger). For example, when T equals three, this process 100 will tolerate the detection of three valves having improperly placed viscous liquid before providing the aforementioned signal.

When using such an approach, if desired, the aforementioned count can be reset to zero (or some other predetermined amount) on some regular basis (such as daily, once an hour, once every five minutes, or such other period of time as may suit the needs of a given application setting). To illustrate, and where T equals three, this process 100 would be tolerant of three improperly provisioned valves for each such cycle of time. More than three such events within the given cycle of time, however, would prompt provision of the aforementioned signal.

It would also be possible to select from amongst the aforementioned possibilities as a function of the measured degree by which a given inspected valve has improperly placed viscous liquid. To illustrate by way of a non-limiting example, when even a single viscous liquid exhibits a periphery that appears to be more than twenty-five percent incomplete, the production line could be brought to a halt and a corresponding alarm sounded. Valves, however, which exhibit a periphery that is between about twenty-five percent and ten percent incomplete could trigger a different approach; in this case, the process could permit installation of the valve but maintain a corresponding count. If and when that count exceeded some predetermined threshold (within, for example, some predetermined window of time such as one hour), then the process could again react by bringing the installation line to a halt.

Those skilled in the art will recognize and appreciate that these teachings are highly flexible and provide various ways of assuring that one-way degassing valves can be quickly and reliably inspected to determine whether an adequate quantity of, for example, silicon oil has been appropriately placed within those valves prior to installation of those valves on containers. This inspection is carried out without destroying the valve or otherwise interfering with installable valve, even during operation of a high speed packaging line where such valves may be processed at rates of once per second, once per half second, once per each tenth of a second, and faster. Those skilled in the art will further recognize and appreciate that these benefits can be attained by leveraging commonly available industrial components and without undue cost.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
   a feeder configured and arranged to provide a plurality of one-way degassing valves to be installed on corresponding containers to thereby facilitate the degasification of contents of the containers;
   a fixture configured and arranged to place a viscous liquid in each of the plurality of one-way degassing valves to provide a corresponding plurality of installable one-way degassing valves;
   an image capture device that is configured and arranged to capture an image of at least a portion of at least some of the plurality of installable one-way degassing valves; and
   a control circuit operably coupled to the image capture device and configured and arranged to automatically and non-destructively determine for the at least some of the plurality of installable one-way degassing valves, prior to installation on the corresponding containers, by using the image captured by the image capture device, whether the viscous liquid has been properly placed.

2. The apparatus of claim 1 wherein the feeder comprises, at least in part, a roll-based feeder.

3. The apparatus of claim 1 wherein the viscous liquid comprises silicon oil.

4. The apparatus of claim 3 wherein the viscous liquid comprises a mixture of silicon oil and graphite.

5. The apparatus of claim 1 wherein the control circuit is configured and arranged to automatically and non-destructively determine for at least some of the plurality of installable one-way degassing valves, prior to installation on the corresponding containers, whether the viscous liquid has been properly placed by making this determination within a few seconds of having so placed the viscous liquid.

6. The apparatus of claim 1 wherein the control circuit is configured and arranged to automatically and non-destructively determine for at least some of the plurality of installable one-way degassing valves, prior to installation on the corresponding containers, whether the viscous liquid has been properly placed by determining whether an appropriate amount of the viscous liquid has been properly placed.

7. The apparatus of claim 1 wherein the control circuit is configured and arranged to automatically and non-destructively determine for at least some of the plurality of installable one-way degassing valves, prior to installation on the corresponding containers, whether the viscous liquid has been properly placed by determining whether the viscous liquid is occupying a proper location within the one-way degassing valve.

8. The apparatus of claim 1 further comprising:
   a light disposed between the image capture device and the installable one-way degassing valve for which an image is to be captured to facilitate capturing a useful image of the installable one-way degassing valve.

9. The apparatus of claim 1 wherein the control circuit is further configured and arranged to, upon determining that the viscous liquid has not been properly placed for at least a predetermined number of the plurality of installable one-way degassing valves, provide a corresponding signal.

10. The apparatus of claim 1 wherein the control unit is adapted to skip the installation of a one-way degassing valve where the viscous liquid was determined to be improperly placed.

11. An apparatus comprising:
    a feeder configured and arranged to provide a plurality of one-way degassing valves to be installed on corresponding containers to thereby facilitate the degasification of contents of the containers;
    a fixture configured and arranged to place a viscous liquid in each of the plurality of one-way degassing valves to provide a corresponding plurality of installable one-way degassing valves; and
    a control circuit configured and arranged to automatically and non-destructively determine for at least some of the plurality of installable one-way degassing valves, prior to installation on the corresponding containers, whether the viscous liquid has been properly placed;
    wherein the control unit is adapted to determine a degree of improper placement of the viscous fluid in a one-way degassing valve and determine whether the degree exceeds a predetermined tolerated threshold value.

12. An apparatus comprising:
    a feeder configured and arranged to provide a plurality of one-way degassing valves to be installed on corresponding containers to thereby facilitate the degasification of contents of the containers;
    a fixture configured and arranged to place a viscous liquid in each of the plurality of one-way degassing valves to provide a corresponding plurality of installable one-way degassing valves; and
    a control circuit configured and arranged to automatically and non-destructively determine for at least some of the plurality of installable one-way degassing valves, prior to installation on the corresponding containers, whether the viscous liquid has been properly placed;

wherein the control unit is adapted to determine whether a shape of the viscous fluid placed in a one-way degassing valve matches a predetermined shape associated with a proper placement.

13. A method comprising:
providing a plurality of one-way degassing valves to be installed on corresponding containers to thereby facilitate the degasification of contents of the containers;
placing a viscous liquid in each of the plurality of one-way degassing valves to provide a corresponding plurality of installable one-way degassing valves; and
automatically and non-destructively determining, for at least some of the plurality of installable one-way degassing valves, prior to installation on the corresponding containers, using a captured image of at least a portion of the at least some of the plurality of installable one-way degassing valves, whether the viscous liquid has been properly placed.

14. The method of claim 13 wherein the contents of the containers comprise coffee.

15. The method of claim 14 wherein the coffee comprises ground coffee.

16. The method of claim 13 wherein providing the plurality of one-way degassing valves comprises providing a roll of one-way degassing valves.

17. The method of claim 13 wherein placing a viscous liquid in each of the plurality of one-way degassing valves comprises placing silicon oil in each of the plurality of one-way degassing valves.

18. The method of claim 17 wherein placing silicon oil in each of the plurality of one-way degassing valves comprises placing a mixture of silicon oil and graphite in each of the plurality of one-way degassing valves.

19. The method of claim 13 wherein automatically and non-destructively determining for at least some of the plurality of installable one-way degassing valves, prior to installation on the corresponding containers, whether the viscous liquid has been properly placed comprises making this determination within a few seconds of having so placed the viscous liquid.

20. The method of claim 19 wherein making this determination within a few seconds of having so placed the viscous liquid comprises making this determination within one second of having so placed the viscous liquid.

21. The method of claim 20 wherein making this determination within one second of having so placed the viscous liquid comprises making this determination within one half second of having so placed the viscous liquid.

22. The method of claim 13 wherein automatically and non-destructively determining for at least some of the plurality of installable one-way degassing valves, prior to installation on the corresponding containers, whether the viscous liquid has been properly placed comprises determining whether an appropriate amount of the viscous liquid has been properly placed.

23. The method of claim 13 wherein automatically and non-destructively determining for at least some of the plurality of installable one-way degassing valves, prior to installation on the corresponding containers, whether the viscous liquid has been properly placed comprises determining whether the viscous liquid is occupying a proper location within the one-way degassing valve.

24. The method of claim 13 wherein automatically and non-destructively determining for at least some of the plurality of installable one-way degassing valves, prior to installation on the corresponding containers, whether the viscous liquid has been properly placed comprises making this determination for substantially all of the plurality of installable one-way degassing valves.

25. The method of claim 13 further comprising:
upon determining that the viscous liquid has not been properly placed for at least a predetermined number of the plurality of installable one-way degassing valves, providing a corresponding signal.

26. The method of claim 25 wherein the predetermined number comprises the number one.

27. The method of claim 13 wherein the automatically and non-destructively determining for at least some of the plurality of installable one-way degassing valves, prior to installation on the corresponding containers, whether the viscous liquid has been properly placed, further comprises skipping the installation of a one-way degassing valve where the viscous liquid was determined to be improperly placed.

28. A method comprising:
providing a plurality of one-way degassing valves to be installed on corresponding containers to thereby facilitate the degasification of contents of the containers;
placing a viscous liquid in each of the plurality of one-way degassing valves to provide a corresponding plurality of installable one-way degassing valves; and
automatically and non-destructively determining, for at least some of the plurality of installable one-way degassing valves, prior to installation on the corresponding containers, whether the viscous liquid has been properly placed, by determining a degree of improper placement of the viscous fluid in a one-way degassing valve, and determining whether the degree exceeds a predetermined tolerated threshold value.

29. A method comprising:
providing a plurality of one-way degassing valves to be installed on corresponding containers to thereby facilitate the degasification of contents of the containers;
placing a viscous liquid in each of the plurality of one-way degassing valves to provide a corresponding plurality of installable one-way degassing valves; and
automatically and non-destructively determining, for at least some of the plurality of installable one-way degassing valves, prior to installation on the corresponding containers, whether the viscous liquid has been properly placed, by determining whether a shape of the viscous fluid placed in a one-way degassing valve matches a predetermined shape associated with a proper placement.

* * * * *